US007313131B2

(12) United States Patent
O'Connor et al.

(10) Patent No.: US 7,313,131 B2
(45) Date of Patent: Dec. 25, 2007

(54) PROCESSING OF COMMUNICATION SESSION REQUEST MESSAGES

(75) Inventors: Neil O'Connor, Galway (IE); Tony McCormack, Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 1155 days.

(21) Appl. No.: 10/420,190

(22) Filed: Apr. 22, 2003

(65) Prior Publication Data

US 2004/0213209 A1    Oct. 28, 2004

(51) Int. Cl.
*H04L 4/66* (2006.01)
(52) U.S. Cl. .................................................. 370/352
(58) Field of Classification Search ............. 370/352
See application file for complete search history.

(56) References Cited

U.S. PATENT DOCUMENTS 6,584,076 B1 *  6/2003  Aravamudan et al. ...... 370/260
6,788,675 B1 *  9/2004  Yang ........................... 370/352

* cited by examiner

*Primary Examiner*—Creighton Smith
(74) *Attorney, Agent, or Firm*—Barnes & Thornburg LLP

(57) ABSTRACT

SIP (session initiation protocol) requests are processed by a networked server having a processor which has a dedicated packet handling circuit (or network-aware co-processor), without passing said requests through an IP stack to an application layer. The co-processor receives SIP requests in the form of IP packets. The co-processor then parses the packets, and thereby identifies a SIP destination address in the datagram of the packet. A memory area accessible by the co-processor has a stored list of SIP addresses and of associated forwarding addresses to which packets containing the listed SIP destination addresses are to be directed. The co-processor directly modifies the packets to include the stored further address, which may be an IP address or a SIP address, associated with the original destination SIP address and then forwards the packets via the network.

21 Claims, 4 Drawing Sheets

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Version | | | | HDLEN | | | | Type of Service | | | | | | | | Total Length (Bytes) | | | | | | | | | | | | | | | |
| Identification | | | | | | | | | | | | | | | | Flags | | | Fragment Offset | | | | | | | | | | | | |
| Time to Live | | | | | | | | Protocol Number | | | | | | | | IP Header Checksum | | | | | | | | | | | | | | | |
| 32 bit Source IP Address | | | | | | | | | | | | | | | | | | | | | | | | | | | | | | | |
| 32 bit Destination IP Address | | | | | | | | | | | | | | | | | | | | | | | | | | | | | | | |
| Source Port Number | | | | | | | | | | | | | | | | Destination Port Number | | | | | | | | | | | | | | | |
| UDP Length | | | | | | | | | | | | | | | | UDP Checksum | | | | | | | | | | | | | | | |

```
INVITE sip:bob@domain.com SIP/2.0
Via: SIP/2.0/UDP 167.180.112.24
From: Alice <sip:alice@hereway.com>
To: Bob <sip:bob@domain.com>
Call-ID: a2e3a@pigeon.hereway.com
Content-Type: application/sdp
Content-Length: 885 c=IN IP4 167.180.112.24
m=audio 38060 RTP/AVP 0
```

FIG. 2

PROCESSING OF COMMUNICATION SESSION REQUEST MESSAGES

FIELD OF THE INVENTION

The present invention relates to methods and apparatus for processing communication session request messages. The invention has particular application in the processing of Session Initiation Protocol (SIP) request messages.

BACKGROUND OF THE INVENTION

In order to establish communications over a network it is necessary to establish a session between the parties. Various protocols exist to accomplish this goal, including SIP, which is the Internet Engineering Task Force (IETF) standard for multimedia conferencing over IP, and which is defined in IETF RFC 3261, the contents of which are incorporated herein by reference.

The main entities in SIP are the User Agent (UA), the SIP Proxy Server (PS) the SIP Redirect Server (RS), and the Registrar. SIP is a client/server architecture in which the UA can act as either a user agent client or UAC (in the case that it is initiating a session) or a user agent server or UAS (in the case where it is responding to a request to initiate a session).

Each user has a SIP address, or more correctly, a SIP Uniform Resource Indicator (URI) in the form sip: user@domain.com or sips:user@domain.com (where sips: identifies the URI as an addressee for a secure call). This SIP address or URI (the terms being used interchangeably herein) is used in SIP requests to establish a call to that user. Because one of the intentions is that SIP should provide mobility to users, a user may log onto a network from any one of a number of locations, and register with the Registrar. The Registrar then notes the network address (IP address) of the user's current location.

When one attempts to establish a session with a user, a request message (of the type INVITE) is sent across the network via a series of proxy and redirect servers. The proxy servers forward on the message to the user (if the proxy server knows the user's location) or to the next server, which may itself be a proxy server or a redirect server. Redirect servers receiving a request will consult a location server which in turn has access to the Registrar server information. Based on the path (or network location) information available to the location server, the redirect server will return the request to the sender with the path information, and the sender (e.g. the previous proxy server in the chain) will re-send the request to the indicated location.

A request message will typically traverse multiple hops before arriving at the intended addressee's UA. This characteristic of the conventional SIP operation mechanism imposes significant processing overheads on all of the servers involved. The main reason for this is that as the request is contained in IP packet format, but the SIP "to:" URI (e.g. "send to: sip:user@domain.com") is an ASCII string in a UDP datagram, the SIP address must be processed through the IP stack to the application layer to determine the address. With multiple SIP requests travelling through any node of the network, the processing overheads throughout the IP stack and in particular at the application layer, are high.

In the context of contact centres (such as call centres or multimedia contact centres), considerable importance is placed on allowing a networked contact centre to offload incoming contacts seamlessly to another contact centre. This might be done, for example, with calls which are in a particular language if the contact centre receiving the calls does not have the resources to efficiently handle calls in that language. It might also be done where all agents at the contact centre are busy. In such cases the contact centre might, either as a rule or while the conditions preventing efficient handling remain in place, transfer such calls to a partner contact centre.

If a SIP server or gateway associated with a contact centre transfers a SIP-based contact to another network location, SIP request is passed through the IP stack to the application layer and a SIP REFER message (similar to the initial INVITE message) is created and sent back to the source via the stack. The REFER message replaces the "to:" SIP address with a "refer to:" field including the SIP address of the new network location, and adds a "referred by:" field containing the SIP address of the referring user. This imposes high processing overheads if all SIP request messages are to be referred to another location.

SUMMARY OF THE INVENTION

The invention provides, in a first aspect, a method of processing a SIP (session initiation protocol) request by a networked server having a processor which has a dedicated packet handling circuit, comprising the steps of:

said dedicated packet handling circuit receiving said request in the form of an IP packet received via a network;

said dedicated packet handling circuit parsing said packet without referring said packet to an application layer, and thereby identifying a SIP destination URI in the datagram of the packet;

determining a further address to which packets containing said SIP destination URI are to be directed;

modifying said packet to include said further address; and forwarding said packet to said further address via the network.

The networked server employed in the method of the present invention has what is referred to in current terminology as a "network processor". Such a processor includes co-processor or microengine circuitry dedicated to speedy handling of packets at the network and transport layers. Thus, rather than processing the packets via a software stack, the lowest layers of the stack are handled by assembly-style software code running on the co-processor. An example of such a processor is the IXP1200 chip from Intel Corporation ("IXP1200" and "Intel" are trade marks of Intel Corporation).

Such co-processors or microengines be programmed with relatively simple instructions to handle packets in a particular way. In the present case, the co-processor can be instructed to identify and extract a SIP URI from a packet and to determine, e.g. by reference to a stored list of addresses, whether information exists locally identifying a further address to which the request should be sent. The co-processor is also programmed with basic instructions to modify the packet to include this further address.

The further address may be a network address (e.g. an IP address) of the location of the SIP addressee (or of the location of a server local to the addressee), or it may be a further SIP URI (allowing the request to be in effect redirected to this new address. Depending on which type of address this further address is, the packet handling circuitry will modify the packet in different ways as explained below in more detail.

As used herein, the terms "preferred", "preferably", or synonymous terms, when applied to the invention, mean that such features are not regarded as essential to the invention.

Preferably the step of determining a further address to which packets containing said SIP destination URI are to be directed involves matching said SIP destination URI with a stored list of SIP URIs, wherein each entry in the stored list includes one or more associated further addresses.

In one instance described below, the further address is an IP address and the step of modifying the request packet includes substituting said further address for the IP address of the server in an IP header and recalculating an IP header checksum. Modifying the IP address may also require recalculation of UDP checksum as the best IP field appears in the UDP "pseudo-header".

In another instance described below the further address is a SIP URI and the step of modifying the request packet includes substituting said further address for the SIP destination URI identified in the received message and recalculating a UDP checksum.

Preferably, the step of parsing said packet without referring said packet to an application layer, and thereby identifying a SIP destination URI involves searching the datagram for a sequence corresponding to an ASCII string characteristic of a SIP destination URI.

Further, preferably, the step of parsing said packet without referring said packet to an application layer, and thereby identifying a SIP destination URI involves beginning said search at an offset and thereby excluding Layer 1-4 header information from said search.

In a preferred embodiment described below, the step of parsing said packet without referring said packet to an application layer, and thereby identifying a SIP destination URI comprises commencing a search, at an offset from the beginning of the message equal to the combined length of the Layer 2, IP and UDP headers, for a bit sequence equivalent to the ASCII text string "to:".

The step of parsing said packet optionally further comprises the step of, upon identifying said bit sequence equivalent to the ASCII string "to:", searching for the next occurrence of the ASCII string "sip:" and copying to memory the bit sequence between said occurrence of "sip:" and the next text delimiter selected from a line break, a space, the ">" symbol, and the ";" symbol.

The skilled person will readily appreciate that different parsing strategies can be used to identify a SIP URI, and that different criteria may be employed over time as the standards governing the layout of the SIP header change over time. The criteria given above reflect certain facts about the currently recognised formats allowed for SIP addresses, such as the facts that:

angle brackets < ... > may currently be used to enclose a SIP "to:" address (and thus searching for a right angle bracket is a potential way of identifying the end of the address);
  the SIP URI may be preceded by a display name (e.g. the header may include "To: Bob <sip: bob@domain.com>", in which case the step of searching for the next occurrence of "sip:" after "to:" will ignore the display name "Bob");
  the SIP URI may be followed by a branch parameter identifying the transaction, with the SIP URI being separated from the branch parameter by a semicolon;
  there may be no semicolon or right angle bracket after the address, in which case the delimiter at the end of the address is likely to be a line break or space.

It is to be understood that the searches can encompass variations such as lower and uppercase strings ("To:"/"to:") or abbreviations ("t:").

In another aspect the invention provides a processor for a SIP server including a dedicated packet handling circuit, said dedicated packet handling circuit being programmed with instructions effective to cause said circuit, upon receipt of a SIP request in the form of a packet, to:

parse said packet without referring said packet to an application layer, and thereby identify a SIP destination address in the datagram of the packet;
  determine a further address to which packets containing said SIP destination address are to be directed;
  modify said packet to include said further address; and
  forward said packet to said further address via the network.

The invention further encompasses a SIP network server including a processor for a SIP server including a dedicated packet handling circuit, said dedicated packet handling circuit being programmed with instructions effective sto cause said circuit, upon receipt of a SIP request in the form of a packet, to:

parse said packet without referring said packet to an application layer, and thereby identify a SIP destination address in the datagram of the packet;
  determine a further address to which packets containing said SIP destination address are to be directed;
  modify said packet to include said further address; and
  forward said packet to said further address via the network.

In another aspect the invention provides a computer program product in machine readable form comprising instructions which when executed in a dedicated packet handling circuit of a processor of a SIP server, cause said circuit, upon receipt of a SIP request in the form of a packet, to:

parse said packet without referring said packet to an application layer, and thereby identify a SIP destination address in the datagram of the packet;
  determine a further address to which packets containing said SIP destination address are to be directed;
  modify said packet to include said further address; and
  forward said packet to said further address via the network.

BRIEF DESCRIPTION OF DRAWINGS

The invention will now be illustrated by the following descriptions of embodiments thereof given by way of example only with reference to the accompanying drawings, in which:

FIG. 2 is a diagram showing the typical structure of a SIP message packet.

DETAILED DESCRIPTION OF PREFERRED EMBODIMENTS

Figure 1:
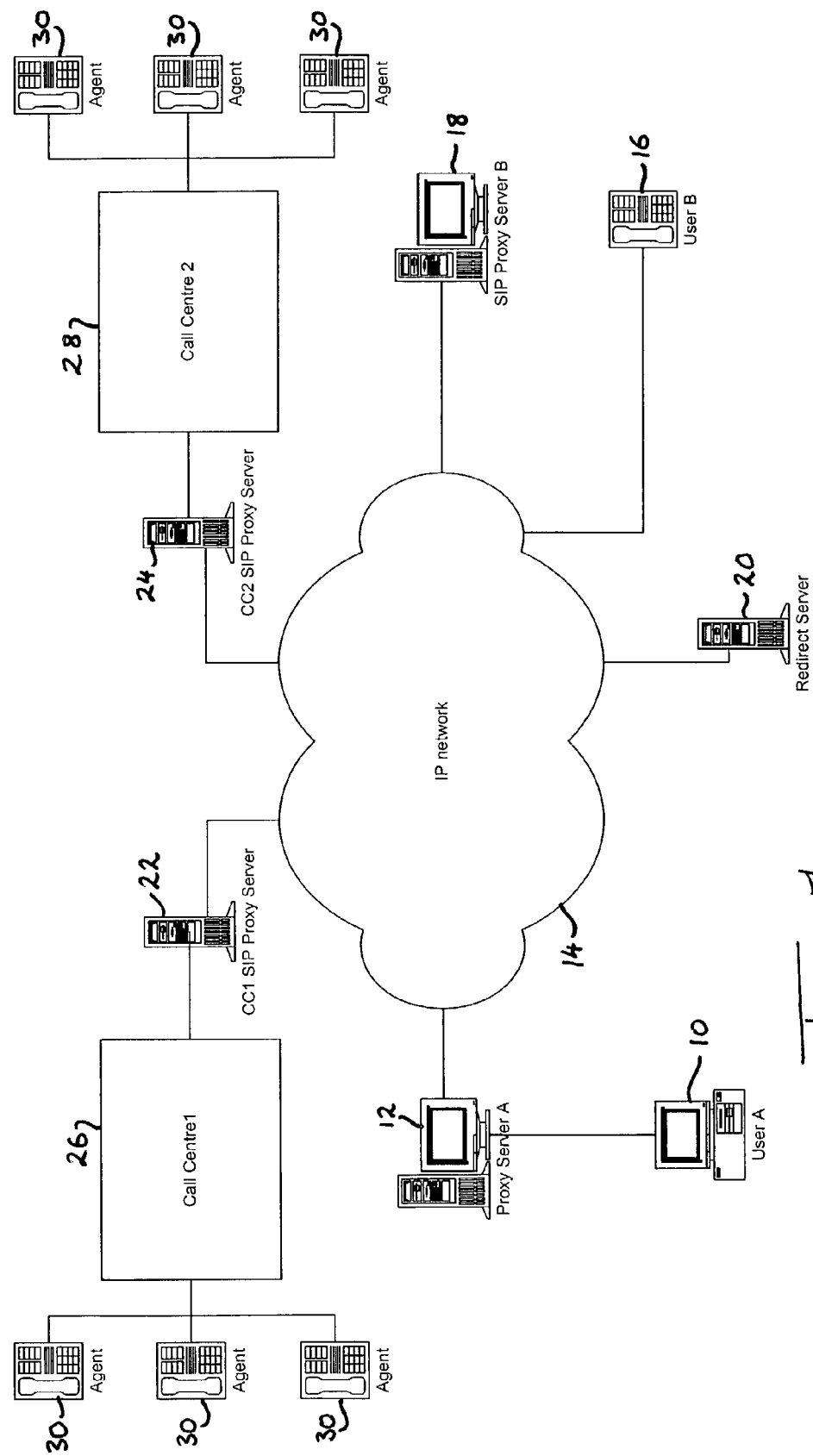
FIG. 1 is an architecture of a SIP environment.

FIG. 1 shows the architecture of a typical SIP environment, involving a number of entities. A personal computer 10 running suitable software operates as a SIP-enabled softphone for a user A. This softphone 10 connects to a SIP proxy server 12 (proxy server A) which in turn connects to an IP network such as the Internet 14. A second user, user B, also connects to the Internet via a SIP-enabled Ethernet phoneset 16. User 16 is registered with a registrar running on a SIP proxy server 18 (shown as SIP proxy server B). A redirect server 20 operates to transfer SIP messages across the IP network. This redirect server also operates a location server function.

Two further proxy servers 22, 24 each provide an interface to a respective call centre 26, 28, at each of which a plurality of agents 30 is located. The call centres receive SIP-based calls via the proxy servers, and receive other calls via the PSTN. Such call centres commonly also receive other media types such as video calls, emails and the like. The calls and other contacts are distributed to the agents in known manner.

The IETS document RFC3261 describing the session initiation protocol provides an overview of the operation of SIP in section 4, the entire contents of which are incorporated herein by reference. The important point of relevance to the present invention is that when a SIP INVITE message is sent from softphone 10 to initiate a call with user B, the IP address of the phoneset 16 at which user B is currently located may not be known. The INVITE message is therefore processed by proxy server 12, redirect server 20 and proxy server 18 before being directed to phoneset 16. (In practice, there will be many more hops involved in a typical call INVITE).

Each entity involved in handling this message passes the message through its IP stack to enable dedicated SIP software to determine the contents of the message and decide on the appropriate method of handling the message. This involves significant amounts of processing time and power in each server, which will typically be dealing with multiple messages.

The structure of a typical packet containing a SIP INVITE message is shown in FIG. 2. A horizontal index, indicated generally at 32, shows the bit numbers in each group of four bytes, such that each horizontal line in the schematic diagram of the packet 34 represents a group of four bytes. The packet 34 consists of an IP header 36 (20 bytes), a UDP header 38 (8 bytes) and a UDP datagram containing the SIP INVITE message 40.

The byte sequences in the IP header 36 and UDP header 38 are well known in the art. In conventional SIP servers, a packet of this type is processed in an IP stack wherein the various layers are processed in turn as the headers are stripped away to reveal the data (in this case a SIP INVITE message), and an appropriate response is formulated by dedicated software for handling SIP messages, before this response is passed down through the stack where the UDP and IP headers are again created and added to the data to provide a packet.

The diagram of FIG. 2 does not show the ethernet header which is a fourteen byte header, and which is advantageously processed in a dedicated co-processor or microengine of a "network processor". Ethernet need not be used of course; other protocols such as ATM or token ring can instead be employed and processed in the same manner.

As indicated above, the UDP data 40 contains a SIP INVITE message. This message is in ASCII format and contains various mandatory fields, although optional fields can be included also.

Because the SIP INVITE message is in ASCII format and contains recognisable fields, and because the beginning of the INVITE message can be located at a predetermined offset from the beginning of the packet (i.e. after the ethernet, IP and UDP headers), it is possible to conduct an efficient search through the bit stream representing this ASCII text to locate bit patterns denoting delimiters of the SIP destination URI.

Figure 3:
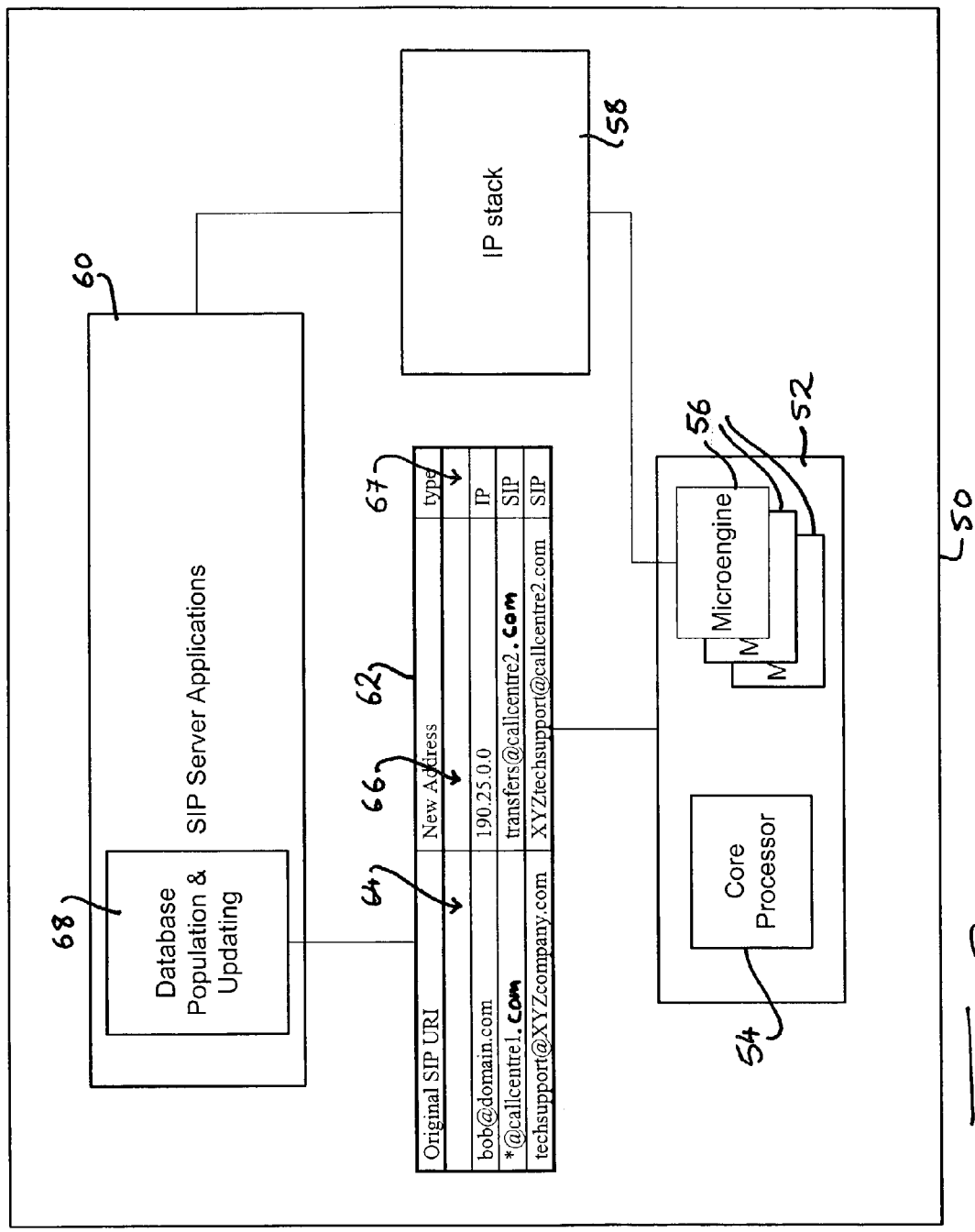
FIG. 3 is a block diagram of the processes and components in a server according to the invention.

Referring to FIG. 3, the components of a SIP server according to the invention are illustrated. The server 50 includes a processor chip 52, an example of which is the Intel IXP1200 processor. Such a processor contains a core processor 54 and one or more co-processors or microengines 56. In particular, at least one microengine is dedicated to processing ethernet packets. Such microengines can also be programmed with simple instruction sets to conduct particular tasks. A flowchart representing such processing is provided in FIG. 4, which will be discussed in more detail below.

Also included in the server is an IP stack 58, and a set of SIP server applications 60 which provide an interface for the handling of SIP packets in accordance with predetermined instructions. The server also includes a memory area 62 which includes two correlated lists of addresses 64, 66. Examples of such addresses are shown in the memory area 62.

Memory area 62 is accessible by the ethernet microengine 56 and can be written to and updated by a database population and updating application 68.

The nature of the addresses contained in the lists 64, 66 is dependent in part on the purpose to which the present invention is put. As an example, a particular SIP URI (such as bob@domain.com) can be correlated with a particular IP address (e.g. 190.25.0.0).

Alternatively, a generic set of SIP URIs (indicated by *@callcentre1.com, where * represents any ASCII string) can be correlated with a particular address at a different domain (e.g. transfers@callcentre2.com).

As a further alternative, a particular SIP URI (textsupport@xyzcompany.com) can be correlated with a further designated SIP URI (e.g. xyztextsupport@callcentre2.com).

Thus, a SIP URI, or a set of SIP URIs may be correlated with one or more further IP addresses or SIP addresses.

Figure 4:
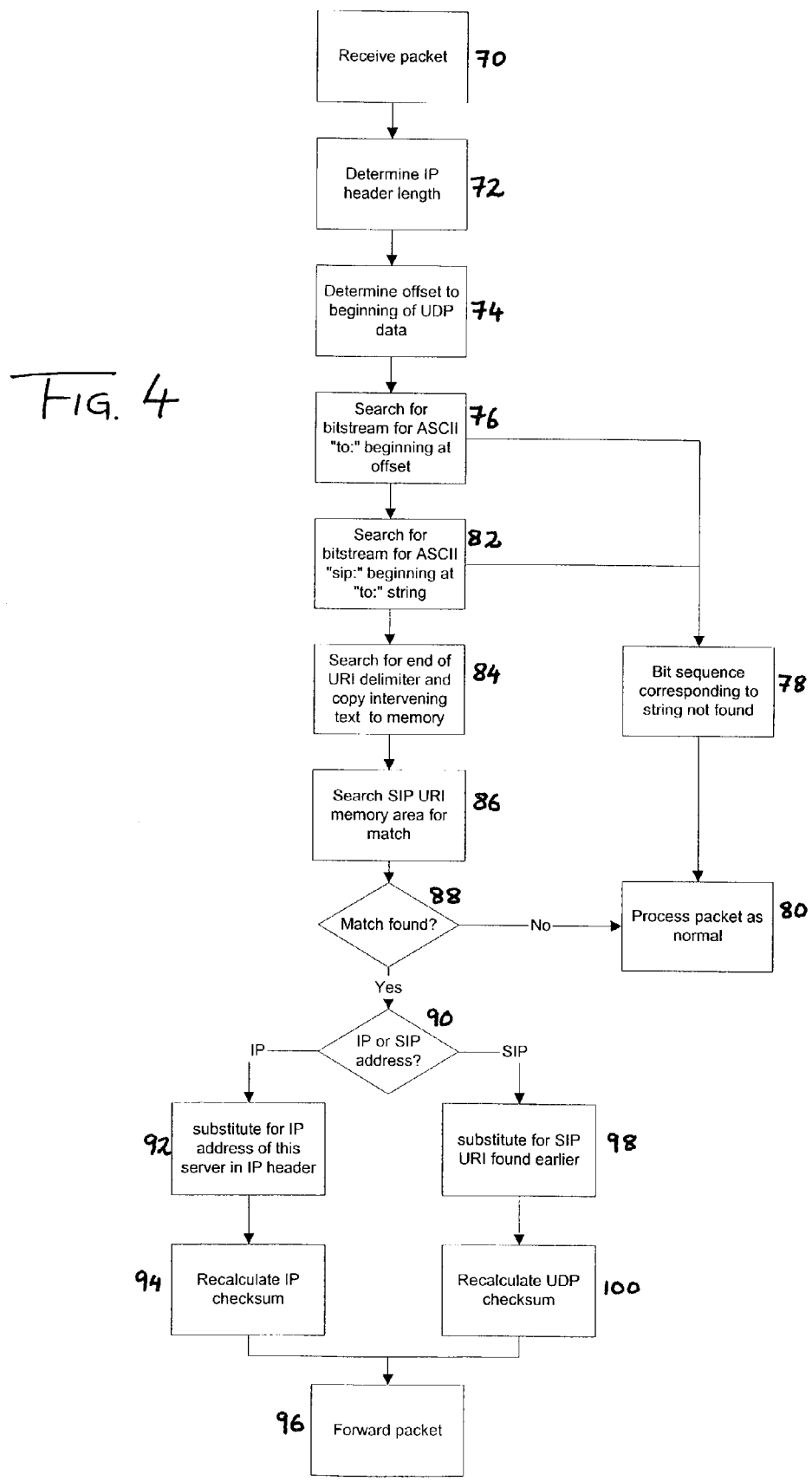
FIG. 4 is a flow chart illustrating a method of the invention.

Referring now to FIG. 4, when a packet is received, step 70, by the ethernet microengine 56, the IP packet contained below the ethernet header is examined by the microengine to determine the IP header length (which can be greater than 20 bytes). As the skilled person will appreciate, this can be done using a very simple instruction set which determines the value of the bits numbered 4-7 in the IP packet (referring back to FIG. 2, the header length (HDLEN) is contained in bits numbered 4, 5, 6 and 7). Although the header length is normally twenty bytes, there can be optional additional fields in the IP header and these additional fields give rise to an increase in the value of HDLEN. This determines an offset to the beginning of the UDP header 38, step72.

Assuming that the IP header is determined to by twenty bytes in length, and given that the UDP header is always eight bytes in length, a simple calculation determines the offset to the beginning of the UDP data (i.e. the beginning of the SIP INVITE message), which in the illustrated example is twenty-eight bytes.

The instructions programmed in the microengine then instruct the microengine to begin searching, at an offset of twenty bytes from the beginning of the IP header, for a bit sequence corresponding to the ASCII string "to:". As indicated above, the search can also look for variants such as "To:", or "t:", etc. This search is conducted in step 76 of FIG. 4, but if the result of this search is that the string is not found, step 78, the packet is processed as normal, step 80, through the IP stack and handled by the SIP applications software or other software running on the server, depending on the nature of the packet. (It should be noted here that the method of the present invention, since it operates in the ethernet microengine, is conducted on all packets as they arrive as a way of locating and handling the SIP INVITE messages (determined according to FIG. 4) automatically. All other packets are handled via the IP stack in conventional manner.

Reverting to step 76, and referring additionally to FIG. 2, it can be seen that due to the strictly specified fields within a SIP INVITE message, the line 44 containing the "To:" string can be expected to be followed immediately, or after a number of intervening characters (such as a right angle bracket, or a display name) by the SIP URI in the form "sip:username@domainname". Accordingly, in step 82 (FIG. 4), the microengine conducts a search for the bit sequence corresponding to the ASCII string "sip:" beginning at the point where the bit sequence corresponding to "to:" ends. Again, if the relevant string is not found, step 78, then the packet is processed as normal, step 80, through the IP stack.

Having located the beginning of the SIP URI, the microengine conducts a further search forward for a bit sequence corresponding to a recognised URI delimiter, such as an end of line, a space, a right angle bracket, etc. step 84. The SIP URI is then copied to temporary memory (or more precisely, the bit stream between "sip:" and the identified delimiter is copied to memory). Alternatively, the text or bitstream copied to memory can also include the characters "sip:" since these strictly speaking are part of the URI, but this is less efficient.

Referring now to FIG. 3, it will be recalled that memory area 62 (which may be a memory area on the processor chip 52 or a shared memory area within the server accessible by the microengine 56) contains the lists of original SIP URIs and a list of corresponding forwarding addresses. The microengine determines whether a match exists between the bit stream stored in its own temporary memory and the list of SIP URIs (which are stored as bit sequences corresponding to ASCII text in the memory area 62), step 86. In the case of the INVITE message shown in FIG. 2 and the list of SIP URIs shown in FIG. 3, a match will be determined for the bit sequence corresponding to bob@domain.com. IF no match is found at this decision branch 88, then the packet is processed as normal, step 80. If a match is found, then the microengine notes if whether it is an IP address or a SIP address, step 90, according to a flag 67 in the lists of corresponding addresses. Taking the case where the new address is identified as being an IP address, this IP address is substituted for the thirty-two bit destination address 46 (FIG. 2) in the IP header (step 92, FIG. 4). Because the IP address is changed in step 92, the IP header checksum 48 (FIG. 2) will be incorrect and this must also be recalculated, step 94 in FIG. 4. The packet is then forwarded directly to this IP address, step 96.

In the example described, the effect of the invention is to enable a particular IP address to be assigned as the network location for a given SIP URI, such as bob@domain.com. The packet can be handled more efficiently by forwarding it directly to that address rather than following the normal SIP procedure of processing the packet through the stack of each server on each hop. It should be noted that the new IP address is not necessarily the address at which the SIP user is located; it could be the address of the proxy server local to that user.

Referring back to FIG. 4, if in step 90 it is identified that the new address is a further SIP URI, this SIP URI is substituted by the microengine for the URI originally located in steps 82 and 84, step 98. Because this changes the UDP data, the UDP checksum (indicated generally at 49 in FIG. 2) is recalculated in step 100. The packet is then forwarded as normal.

As a particular example of the usefulness of the invention, one can consider the case where user A at softphone 10 wishes to place a SIP-based call to a call centre 26 (FIG. 1) using, for example, the SIP URI textsupport@xyzcompany.com. The SIP INVITE message relating to the placing of his call is thus directed to SIP proxy server 22. In the scenario where the call centre 26 is out of action or is too busy to accept further calls, a service contract may exist with the second call centre 28 shown in FIG. 1 to take excess calls. Accordingly, it is desirable that all SIP INVITE requests sent to the URI SIP: textsupport@xyzcompany.com should be redirected, during the period when the first call centre is busy, to the proxy server 24 and handled within call centre 28 by agents who have the skillset to deal with the technical support issues normally handled in call centre 26.

This can be achieved by the process of FIG. 4 running on SIP proxy server 22, where the original SIP URI textsupport@xyzcompany.com is searched for and replaced by xyztextsupport@callcentre2.com (see FIG. 2). Advantageously, the IP address of the SIP proxy server 24 will also be associated with the URItextsupport@xyzcompany.com, and the method of the invention will substitute both the IP address and the SIP URI as described in the two branches leading from decision 90 in FIG. 4. The SIP INVITE message can therefore be reconfigured immediately by the microengine within SIP proxy server 22 and "bounced" to SIP proxy server 24 without being processed through the stack of proxy server 22. Upon receipt at SIP proxy server 24, the management software running in call centre 28 will be informed by the SIP proxy server 24 of the existence of a SIP INVITE directed to sip: xyztextsupport@callcentre2.com, and this contact can then be allocated to an agent 30 having the skillset suitable to deal with such a contact.

In a further advantageous variation on this method, SIP proxy server 24 at the second call centre could be configured automatically to direct all calls containing the SIP URI xyztextsupport@callcentre2.com to a particular agent using that agent's SIP address. In other words, a second substitution would be made within SIP proxy server 24 to redirect the call to the most appropriate agent, based on the skillset requirements for calls originally directed to call centre 26.

While the invention has been described in detail in relation to SIP INVITE requests, other requests within the SIP protocol can be handled in the same way to bypass the normal packet handling procedures within a server processor.

It will also be appreciated that the process can run on a redirect server such as server 20 (FIG. 1) as an efficient way of redirecting SIP messages which it is required to handle.

The invention is not limited to the embodiments describer herein which may be departed from or varied within the scope and spirit of the claimed invention.

What is claimed is:

1. A method of processing a SIP (session initiation protocol) request by a networked server having a processor which has a dedicated packet handling circuit, comprising the steps of:
    said dedicated packet handling circuit receiving said request in the form of an IP packet received via a network;

said dedicated packet handling circuit parsing said packet without referring said packet to an application layer, and thereby identifying a SIP destination address in the datagram of the packet;
determining a further address to which packets containing said SIP destination address are to be directed;
modifying said packet to include said further address; and
forwarding said packet to said further address via the network.

2. A method as claimed in claim 1, wherein said further address is a network address.

3. A method as claimed in claim 2, wherein said network address is an IP address.

4. A method as claimed in claim 3, wherein said IP address is the IP address of the location of the SIP addressee or of the location of a server local to the addressee.

5. A method as claimed in claim 2, wherein said further address is a further SIP address.

6. A method as claimed in claim 1, wherein the step of determining a further address to which packets containing said SIP destination address are to be directed involves matching said SIP destination address with a stored list of SIP addresses, wherein each entry in the stored list includes one or more associated further addresses.

7. A method as claimed in claim 3, wherein the step of modifying the request packet includes substituting said further address for the IP address of the server in an IP header and recalculating an IP header checksum and UDP checksum.

8. A method as claimed in claim 5, wherein the step of modifying the request packet includes substituting said further SIP address for the SIP destination address identified in the received message and recalculating a UDP checksum.

9. A method as claimed in claim 1, wherein the step of parsing said packet without referring said packet to an application layer, and thereby identifying a SIP destination address comprises searching the datagram for a sequence corresponding to an ASCII string characteristic of a SIP destination address.

10. A method as claimed in claim 9, wherein the step of parsing said packet without referring said packet to an application layer, and thereby identifying a SIP destination address involves beginning said search at an offset and thereby excluding header information from said search.

11. A method as claimed in claim 10, wherein the step of parsing said packet without referring said packet to an application layer, and thereby identifying a SIP destination address comprises commencing a search, at an offset from the beginning of the message equal to the combined length of the Layer 2, IP and UDP headers, for a bit sequence equivalent to an ASCII text string selected from the strings "to:", "TO:", "t:" and "T:".

12. A method as claimed in claim 11, wherein the step of parsing said packet further comprises the step of, upon identifying said bit sequence equivalent to said ASCII string, searching for the next occurrence of the ASCII string "sip:" and copying to memory the bit sequence between said occurrence of "sip:" and the next text delimiter selected from a line break, a space, the ">" symbol, and the ";" symbol.

13. A method as claimed in claim 1, wherein said step of modifying said packet to include said further address comprises adding a "refer to:" field including said further address.

14. A method as claimed in claim 13, further comprising adding to the packet a "referred by:" field containing an address of said networked server or of a SIP server associated therewith.

15. A method as claimed in claim 13, wherein adding said "refer to:" field comprises substituting said "refer to:" field for the original "to:" field.

16. A processor for a SIP server including a dedicated packet handling circuit, said dedicated packet handling circuit being programmed with instructions effective to cause said circuit, upon receipt of a SIP request in the form of a packet, to:
parse said packet without referring said packet to an application layer, and thereby identify a SIP destination address in the datagram of the packet;
determine a further address to which packets containing said SIP destination address are to be directed;
modify said packet to include said further address; and
forward said packet to said further address via the network.

17. A SIP network server including a processor for a SIP server including a dedicated packet handling circuit, said dedicated packet handling circuit being programmed with instructions effective to cause said circuit, upon receipt of a SIP request in the form of a packet, to:
parse said packet without referring said packet to an application layer, and thereby identify a SIP destination address in the datagram of the packet;
determine a further address to which packets containing said SIP destination address are to be directed;
modify said packet to include said further address; and
forward said packet to said further address via the network.

18. A SIP network server as claimed in claim 17, further comprising a store accessible by said dedicated packet handling processor, said store being for storing a set of SIP addresses and, for each stored SIP address, storing a further address, whereby said circuit determines said further address from said store.

19. A SIP network server as claimed in claim 18, further comprising an associated memory area containing an application which when executed enables said store to be dynamically updated with SIP addresses and further addresses associated with said SIP addresses.

20. A SIP network server as claimed in claim 19 wherein said associated memory area is on a remote computer connected via a communications link to said SIP network server, whereby said application is adapted to remotely update said store.

21. A computer program product in machine readable form comprising instructions which when executed in a dedicated packet handling circuit of a processor of a SIP server, cause said circuit, upon receipt of a SIP request in the form of a packet, to:
parse said packet without referring said packet to an application layer, and thereby identify a SIP destination address in the datagram of the packet;
determine a further address to which packets containing said SIP destination address are to be directed;
modify said packet to include said further address; and
forward said packet to said further address via the network.

* * * * *